United States Patent [19]
Hardman

[11] Patent Number: 6,122,490
[45] Date of Patent: Sep. 19, 2000

[54] SYSTEM FOR ENSURING TYPE ACCEPTANCE REQUIREMENTS AND ENHANCING EQUIPMENT CAPABILITIES IN A RF SYSTEM

[75] Inventor: Gordon Edward Hardman, Boulder, Colo.

[73] Assignee: Crosslink, Inc., Boulder, Colo.

[21] Appl. No.: 09/017,079

[22] Filed: Feb. 2, 1998

[51] Int. Cl.[7] ...................................................... H04B 1/38
[52] U.S. Cl. ............................................. 455/90; 455/129
[58] Field of Search ..................................... 455/550, 575, 455/90, 97, 128, 129, 120, 556, 557; 343/702

[56] References Cited

U.S. PATENT DOCUMENTS

| | | |
|---|---|---|
| 4,593,409 | 6/1986 | Miller . |
| 5,483,680 | 1/1996 | Talbot ..................... 455/129 |
| 5,564,086 | 10/1996 | Cygan et al. ............. 455/129 |
| 5,732,335 | 3/1998 | Svensson ................. 455/129 |
| 5,822,705 | 10/1998 | Lehtola ..................... 455/90 |
| 5,862,458 | 1/1999 | Ishii ......................... 455/129 |
| 5,913,174 | 6/1999 | Casarez et al. ............ 455/90 |

FOREIGN PATENT DOCUMENTS

| | | |
|---|---|---|
| 0 523 272 A1 | 1/1993 | European Pat. Off. . |
| 62084624 | 4/1985 | Japan . |
| 08293846 | 4/1995 | Japan . |

*Primary Examiner*—Edward F. Urban
*Attorney, Agent, or Firm*—Duft, Graziano & Forest, P.C.

[57] ABSTRACT

An interrogation system for enabling transmission and/or reception of RF signals by a communication system. In accordance with the present invention, an interrogation is performed between a transceiver and an antenna prior to the transceiver transmitting or receiving RF signals via the antenna. The interrogation is used to determine whether the antenna transmits and/or receives RF signals having the power and/or frequency band required by the transceiver. The interrogation is performed by an interrogating device transmitting an interrogation signal to the other, responding device. The responding device transmits a response signal to the interrogating device in response to receiving the interrogation signal. The interrogating device determines if the response signal has a predetermined characteristic. If the response signal has the predetermined characteristic, transmission and/or reception of RF signals is enabled. An alternative use of the interrogation is to identify which one of a plurality of antennas connected to the transceiver is to be used to transmit or receive RF signals.

40 Claims, 8 Drawing Sheets

SYSTEM FOR ENSURING TYPE ACCEPTANCE REQUIREMENTS AND ENHANCING EQUIPMENT CAPABILITIES IN A RF SYSTEM

FIELD OF THE INVENTION

The present invention relates to an interrogation between a transceiver and an antenna in a RF signal transmitting and/or receiving system. More particularly, the present invention relates to enabling transmission or reception of RF signals in response to a successful interrogation being completed. Still more particularly, the present invention relates to an interrogation that determines whether the antenna connected to a transceiver in the RF system transmits or receives RF signals at the frequency band and the power that is required by the transceiver before enabling the transmission or reception of RF signals.

PROBLEM

In today's society, many devices use radio frequency (RF) signals to transmit data or to perform other functions. Some examples of devices that use RF signals are automatic garage door openers, keyless remote entry systems for automobiles, radio broadcasts, and television broadcasts. With the proliferation of the use of RF signals, it is a problem to prevent RF signals of one device from interfering with RF signals of a second device.

One manner of reducing the interference of RF signals from different devices is to limit the power of RF signals transmitted by a device. The limiting of the power of RF signals limits the range of the RF signals and prevents the transmitted RF signals from interfering with other RF signals. An example of a device with limited signal power RF is a cordless telephone system.

A cordless telephone system has a base station and a remote handset. Both the base station and remote handset have a transceiver and a remote antenna for transmitting and receiving RF signals. The base of the cordless telephone system station is connected to a telephone line. When incoming telephonic signals are received by the base station over the telephone line, the base station converts the incoming telephonic signals to RF signals, and transmits the RF signals over the air to the remote handset. The remote handset receives the RF signals, converts the signals to audio signals and transmits the audio signals over a speaker to a user. When the remote handset receives audio from a user via a microphone, the remote handset converts the audio to RF signals and transmits the RF signals over the air to the base station. The base station receives RF signals from the remote handset, converts the RF signals to telephonic signals, and transmits the telephonic signals over the telephone line. The range of the RF signals transmitted between the base station and the remote handset in a cordless phone system is typically limited to a radius of 50 to 100 feet or about the area of a house to prevent interference with other cordless phone systems and other RF signals.

In order to prevent interference between RF signals of different devices, such as cordless telephone systems, the Federal Communication Commission (FCC) regulates the manufacture of limited power transceivers and antennas. In order to prevent users of such devices from altering the power and increasing the range of the RF signals transmitted by a device, the FCC requires manufacturers to provide a method for preventing the substitution of an antenna having a higher gain for an antenna approved for the system. A common method for preventing the substitution of antennas is the use of custom-made connectors to connect the antenna to a feeder-line from the transceiver. However, there are several disadvantages to using custom-made connectors to prevent substitution of antennas.

One disadvantage of custom-made connectors is that they do not adequately prevent the substitution of antennas. It is possible to design adaptors that facilitate the connection of a higher gain antenna to a custom-made connector. Furthermore, it is also possible to manufacture the custom-made connectors separately and to incorporate the connectors into higher gain antennas.

A second disadvantage of custom-made connectors is the increased cost associated with the use of a custom-made connector. A new custom-made connector must be designed for each new type of device designed. This increases the design cost of the new device. The cost per unit of the new device is also increased since the custom-made connectors cannot be produced in greater volumes to take advantage of economies of scale. Different tooling is also required to install the custom-made connector into the device. This increases the manufacturing cost of the new device. The manufacturer must also train personnel to install, test, maintain, and use the custom-made connectors. The cost to a user is also increased because the user must maintain an inventory of each type of custom-made connector in use in order to replace a defective connector.

There is a need in the art for a more reliable and inexpensive process for preventing the substitution of a higher gain antenna in a limited power RF signal transmission system.

Furthermore, sometimes it is necessary to connect multiple antennas to a single transceiver in a limited power RF system. One possible reason for connecting multiple antennas to one transceiver is to allow the transceiver to transmit or receive RF signals from different remote sites. A second reason for connecting multiple antennas to one transceiver is to transmit or receive RF signals of varying power or of varying frequency bands. There are several problems that arise from connecting multiple antennas to a transceiver.

One problem with connecting multiple antennas to a transceiver in a limited power system is each antenna in the system may require a different custom-made connector in order to meet the FCC regulations. Each system must be designed separately to provide the different connectors for each antenna. The different custom-made connectors needed for each antenna makes it impossible to make the antennas interchangeable or modular. This increases both the maintenance and design costs of such a system. It is also a problem for designers of multiple antenna systems to provide a simple method for indicating which antenna to connect to the transceiver to transmit or receive RF signals. There is a need in the art for the provision of a communication system that provides for the modular connection of multiple antennas to one transceiver.

SOLUTION

The above and other problems are solved and an advance in the art is made by the provision of a system in which an interrogation is made between a transceiver and an antenna prior to a transmission or reception of RF signals. In accordance with the present invention, a successful interrogation must be completed before the transceiver can transmit or receive RF signals via an antenna connected to the transceiver. If the interrogation is not successful, the transceiver/antenna system is disabled so that RF signals cannot be transmitted or received by the transceiver. A transceiver capable of interrogating antennas can also be used in a system having multiple antennas connected to the transceiver. In a multiple antenna system, interrogation can be used by the transceiver to identify which antenna to operatively connect to the transceiver to transmit or receive RF signals.

In accordance with the present invention, both the transceiver and the antenna have a controller. The controller of the transceiver only allows the transceiver to transmit or receive RF signals via an antenna if the interrogation is successful and the controller in the antenna only allows the antenna to transmit or receive RF signals if the interrogation is successful. In the preferred embodiment of the present invention, the controller for both the transceiver and the antenna is a processing unit which performs all of the operations required to perform the interrogation. The processing unit in each controller includes a processor connected to a memory. The memory in each control stores instructions for performing processes needed to complete the interrogation and the processor in each controller performs the instructions stored in the memory to complete the interrogation.

In accordance with the present invention, the transceiver is at a first location and the antenna is at a remote location. A communications path, such as a feeder-line, connects the antenna and the transceiver. Prior to a transmission of RF signals, an interrogation takes place between the controllers of the transceiver and the antenna to determine if a legitimate antenna is connected to the transceiver. A legitimate antenna is an antenna that transmits and receives RF signals at the frequency band and power required by the transceiver. The interrogation begins by the controller of an interrogating device, either the transceiver or the antenna, transmitting an interrogation signal to the controller of the responding device. Upon receiving the interrogation signal, the controller of the responding device transmits a response signal back to the interrogating device. The response signal includes a predetermined characteristic such as an identification code. The interrogating device determines if the response signal has the predetermined characteristic that the interrogating device expects to receive. If the response signal has the predetermined characteristic, the controller of the interrogating device enables the transmission or reception of RF signals by the transceiver via the antenna.

Additional security is provided by only enabling the transmission or reception of RF signals if controller of the responding device determines that the interrogation signal contains a predetermined characteristic. If the interrogation signal contains the predetermined characteristic, the controller of the responding device enables transmission of RF signals and transmits a response signal over the communications path to the interrogating device. If the interrogation signal does not contain the predetermined characteristic, the transmission or reception of RF signals is disabled and a response signal is not transmitted to the controller of interrogating device. This makes it more difficult to establish a connection since both the controller of the interrogating device and the controller of the responding device must receive a signal having a predetermined characteristic before the transceiver can transmit or receive RF signals via the antenna.

Another additional security feature is to periodically perform the interrogation during the transmission or reception of RF signals. This prevents the use of a legitimate antenna to enable the transmission or reception of RF signals and the substituting of an illegitimate antenna for the legitimate antenna after the enablement.

When multiple antennas are connected to the transceiver via the communications path, the interrogation can be used to specify which antenna to use to receive or transmit RF signals. In a multiple antenna system, each antenna has a unique identification which is stored in the memory of the antenna controller. The system is enabled in the following manner. First, the controller for the transceiver determines which antenna to use. An interrogation signal that includes the unique identification of the antenna to use is generated by the transceiver controller. The interrogation signal is then transmitted over the communication path to all of the antenna controllers. The controller in each antenna determines if the interrogation signal includes the identification of the connected antenna. If the interrogation signal does not contain the identification of the connected antenna, the controller prevents the antenna from receiving or transmitting RF signals. If the interrogation signal contains the identification of the connected antenna, the antenna controller allows the antenna to receive and/or transmit RF signals. A response signal is transmitted over the communication path to the transceiver controller after the antenna is enabled. The response signal contains a predetermined characteristic identifying the enabled antenna. If the transceiver controller receives a response signal having the predetermined characteristic identifying the proper antenna, the controller of the transceiver allows the transceiver to receive or transmit RF signals via the communications path. If no response signal is received or the response signal does not have the predetermined characteristic identifying the correct antenna, the controller of the transceiver prevents the transceiver from receiving and/or transmitting RF signals via the antennas. The system of the present invention provides for an interrogation between a transceiver and an antenna prior to enabling the transmission or reception of RF signals by the transceiver via an antenna.

DESCRIPTION OF THE DRAWINGS

The above and other features of the invention will be evident from a reading of the following detailed description taken in conjunction with the drawings in which.

DETAILED DESCRIPTION

Figure 1:
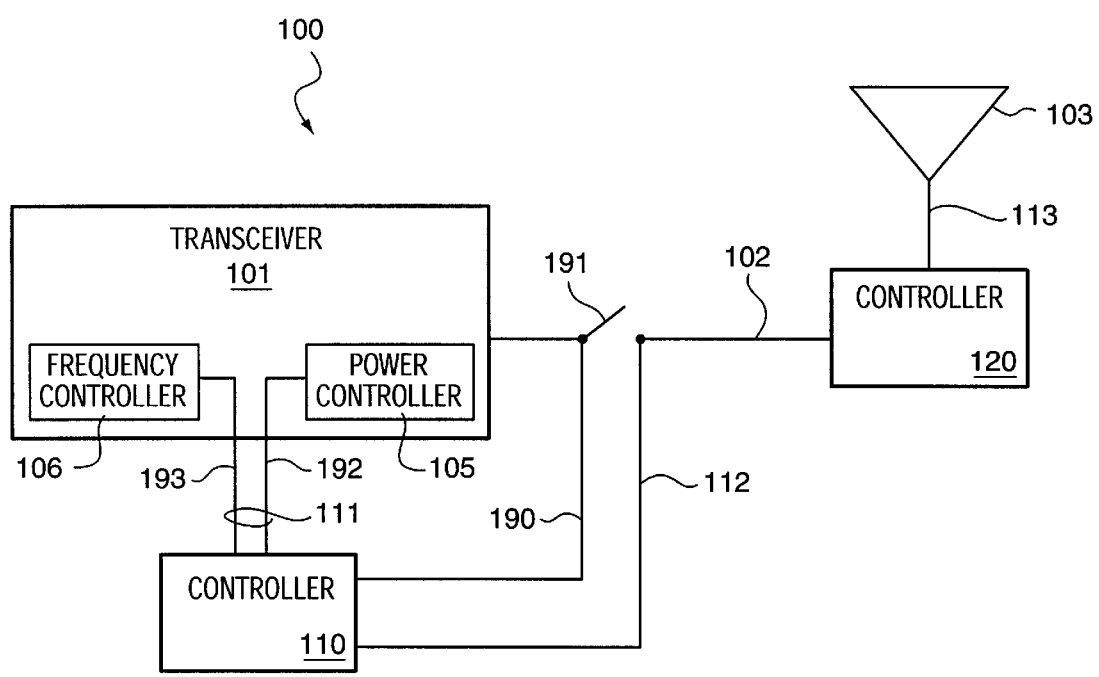
FIG. 1 illustrates a communications system of one possible preferred embodiment of the present invention.

Communications System Having a Transceiver and an Antenna FIG. 1

FIG. 1 illustrates RF communications system 100 for receiving and broadcasting RF signals. Transceiver 101 transmits and/or receives RF signals. An example of a common transceiver is the SS-220 902–928 MHZ Spread Spectrum Transceiver produced by Apex Wireless Inc., of Boulder, Colo. RF signals are transmitted between transceiver 101 and antenna 103 via feeder-line 102. Antenna 103 broadcasts and receives RF signals. An example of a common antenna is a M9155P Antenna produced by Antennas America, Inc., of Golden, Colo. Feeder-line 102 connects transceiver 101 and antenna controller 120 to transmit RF signals between transceiver 101 and antenna 103.

In accordance with the present invention, transceiver controller 110 enables or disables the transmission of RF signals to and from transceiver 101 via feeder-line 102. Transceiver controller 110 is connected to feeder-line 102 via path 112 and to transceiver 101 via path 111. Control signals for controlling the power of signals generated by transceiver 101 are transmitted from controller 110 to power control 105 via path 192. Frequency controller 106 of transceiver 101 receives control signals from controller 110 via path 192 of path 111. One possible method for disabling the transmission or reception of RF signals via feeder-line 102 is for transceiver controller 110 to toggle a switch 191 via path 190 to selectively connect transceiver 101 to feeder-line 102. In a second alternative embodiment (not shown), transceiver 101 is not directly connected to feeder-line 102 and transceiver controller 110 routes RF signals between transceiver 101 and feeder-line 102 via paths 111 and 112.

Antenna controller 120 enables or disables transmission or reception of RF signals between antenna 103 and feeder-line 102. Feeder line 102 is connected to antenna controller 120 which receives and transmits RF signals to and from transceiver 101 via feeder-line 102. Antenna controller 120 transmits and receives both RF and control signals to and from antenna 103 via path 113. The present invention relates to an interrogation that takes place between transceiver controller 110 and antenna controller 120 to enable or disable transmission and/or reception of RF signals.

Figure 2:
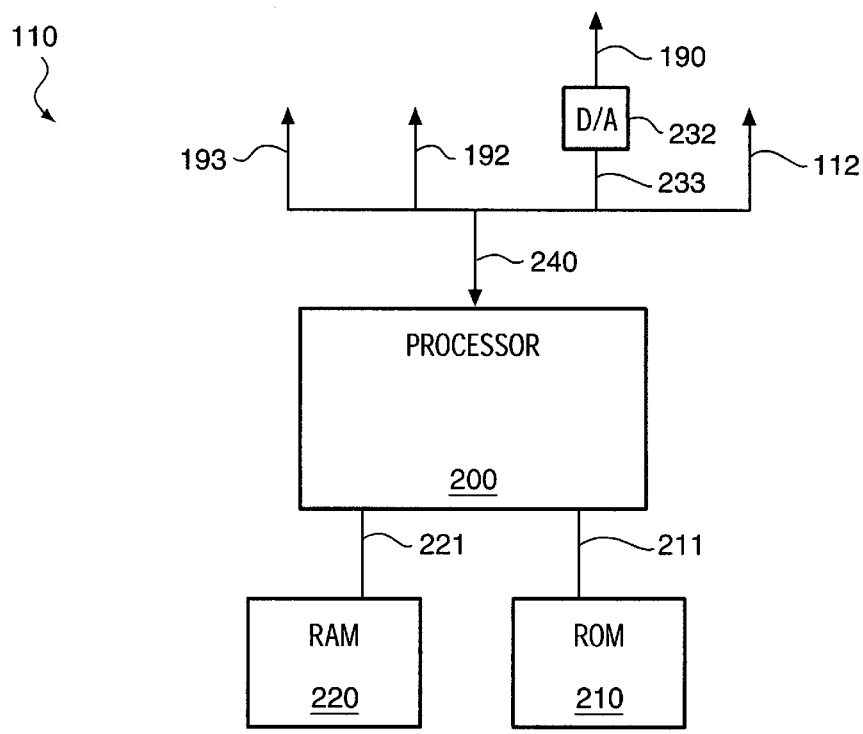
FIG. 2 illustrates a controller for a transceiver in the preferred embodiment of the present invention.
Figure 3:
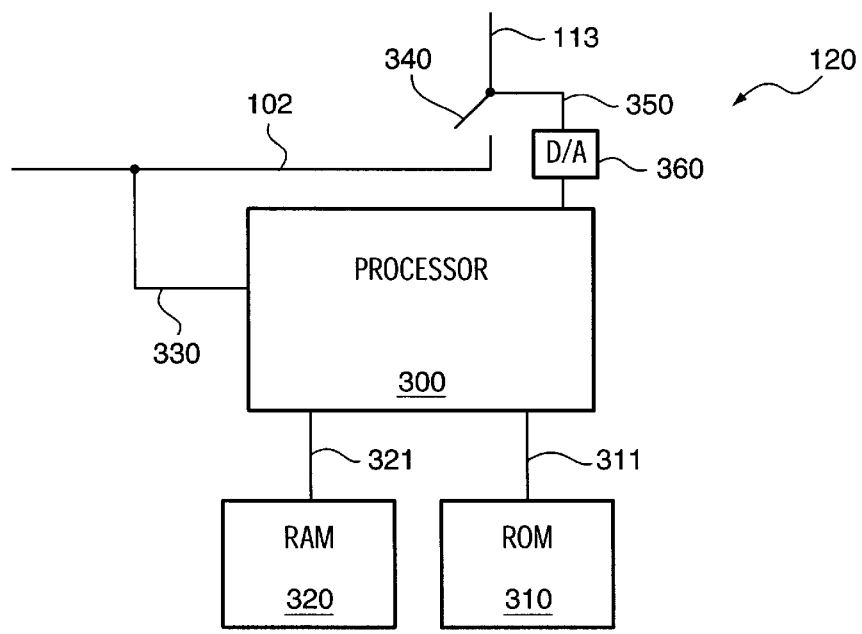
FIG. 3 illustrates a controller for an antenna in the preferred embodiment of the present invention.

In the preferred embodiment of the present invention transceiver controller 110 is a processing unit as illustrated in FIG. 2 and antenna controller 120 is a processing unit as illustrated in FIG. 3. In the preferred embodiment, transceiver controller 110 and antenna controller 120 transmit data to each other via feeder-line 102. However, a separate communications path can be used transmission of signals between the controllers.

Transceiver Controller 110—FIG. 2

Transceiver controller 110 of the preferred embodiment is illustrated in FIG. 2. Processor 200 receives and transmits control signals to transceiver 101 via feeder-line 102 and I/O bus 240. Data signals from antenna controller 120 are received via path 112. Control signals transmitted to switch 191 are transmitted to digital to analog (D/A) converter 232 from processor 200 via I/O bus 240 and path 232. The analog signals are then transmitted to switch 191 via path 190. Processor 200 transmits control signals to power controller 105 via I/O bus 240 and path 192. Control signals are transmitted from processor 200 to frequency over I/O bus 240 and path 193.

Instructions for operating transceiver 101 and performing the interrogation in accordance with the present invention are stored in Read Only Memory (ROM) 210. Processor 200 reads the instructions from ROM 210 via path 211. Data needed to perform the instructions for the interrogation in accordance with the present invention and the operation of transceiver 101 are stored in Random Access Memory 220. Processor 200 reads data from and writes data to RAM 220 via path 221.

Antenna Controller 120—FIG. 3

Antenna controller 120 of the preferred embodiment is illustrated in FIG. 3. Processor 300 is a processing unit. Instructions for performing the interrogation in accordance with the present invention and for operating antenna 103 are stored in ROM 310. Processor 300 reads the instructions from ROM 310 via path 311. Data needed to perform the interrogation in accordance with the present invention and to perform the operation of antenna 103 are stored in RAM 320. Processor 300 reads data from and writes data to RAM 320 via path 312. Path 330 connects processor 300 to feeder-line 102. Data signals to and from transceiver controller 110 are transmitted over feeder-line 102 and path 336.

Switch 340 is toggled by receiving control signals from processor 300 via path 350. Control signals from processor 300 to switch 390 are transmitted to D/A converter 360 via path 361. The analog signals are transmitted to switch 340 via path 350. When switch 340 is toggled to a closed position, path 113 is connected to feeder-line 102 to allow antenna 103 to transmit RF signals to or receive RF signals from transceiver 101. When switch 340 is in the open position, path 113 is not connected to feeder-line 102 and antenna 102 is prevented from receiving or transmitting RF signals.

Figure 4:
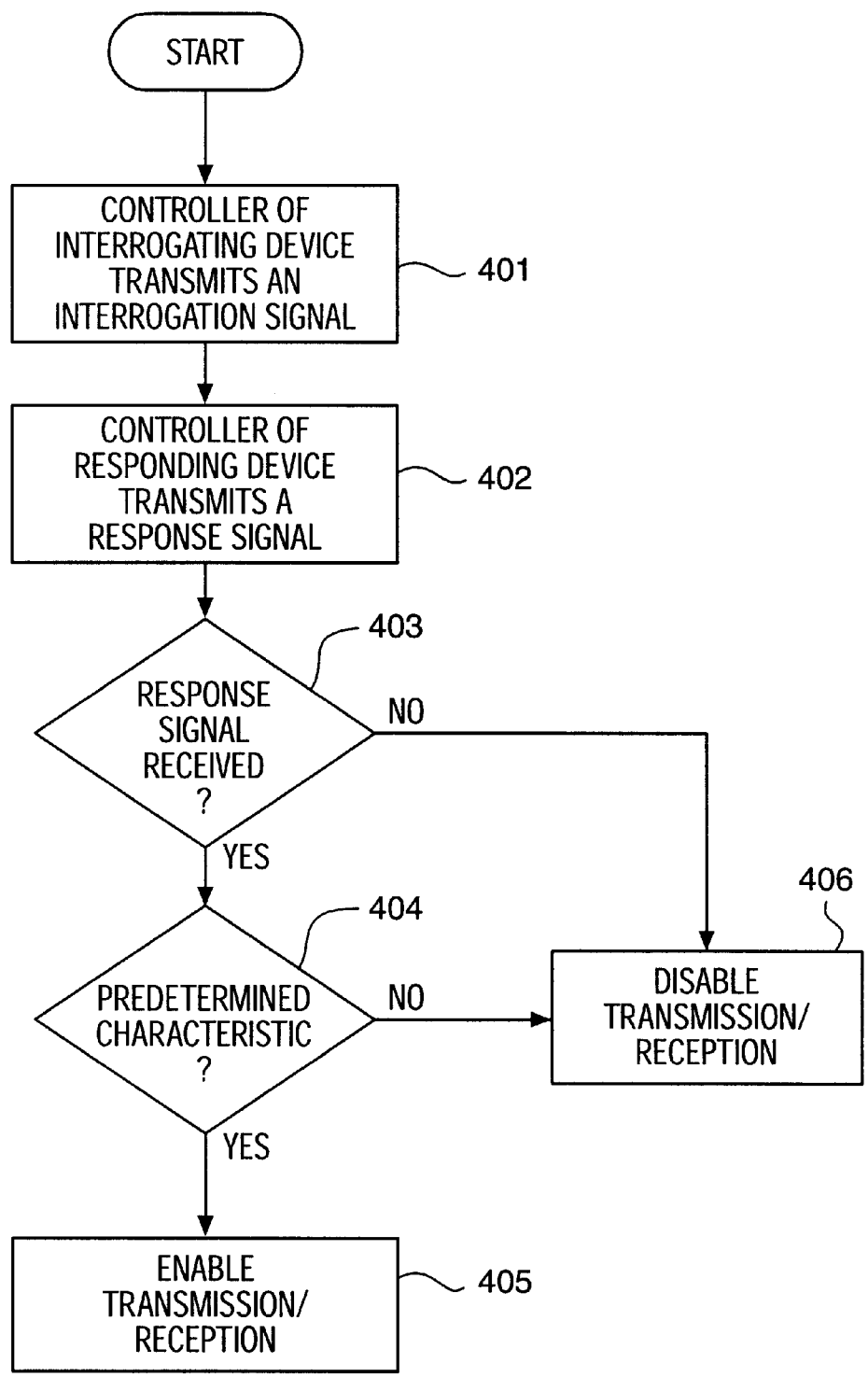
FIG. 4 illustrates an operational overview of an interrogation process provided by the present invention.

Operational Overview of Interrogation—FIG. 4

FIG. 4 illustrates an operational overview of the interrogation performed in accordance with the present invention to determine whether an antenna having the proper gain or some other required attribute is connected to transceiver 101. Process 400 begins with the controller of an interrogating device, either transceiver controller 110 or antenna controller 120, transmitting an interrogation signal to the controller of the other, responding device over feeder-line 102 in step 401. In step 402, the controller of the responding device transmits a response signal to the controller of the interrogating device in response to receiving the interrogation signal. In step 403, the controller of the interrogating device determines if a response signal is received. If a response signal is not received, the controller of the interrogating device disables the transmission or reception of RF signals by the system in step 406. If a response signal is received, the controller of the interrogating device determines if the response signal has a predetermined characteristic, such as a proper identification code, in step 404. If the response signal does not have the predetermined characteristic, the controller of the interrogating device disables the system from receiving or transmitting RF signals in step 406 by preventing the interrogating device from receiving or transmitting RF signals via feeder-line 102. If the response signal does have the predetermined characteristic, the controller of the interrogating device enables the interrogating device to transmit and receive RF signals to the responding device via feeder-line 102 in step 405.

Figure 5:
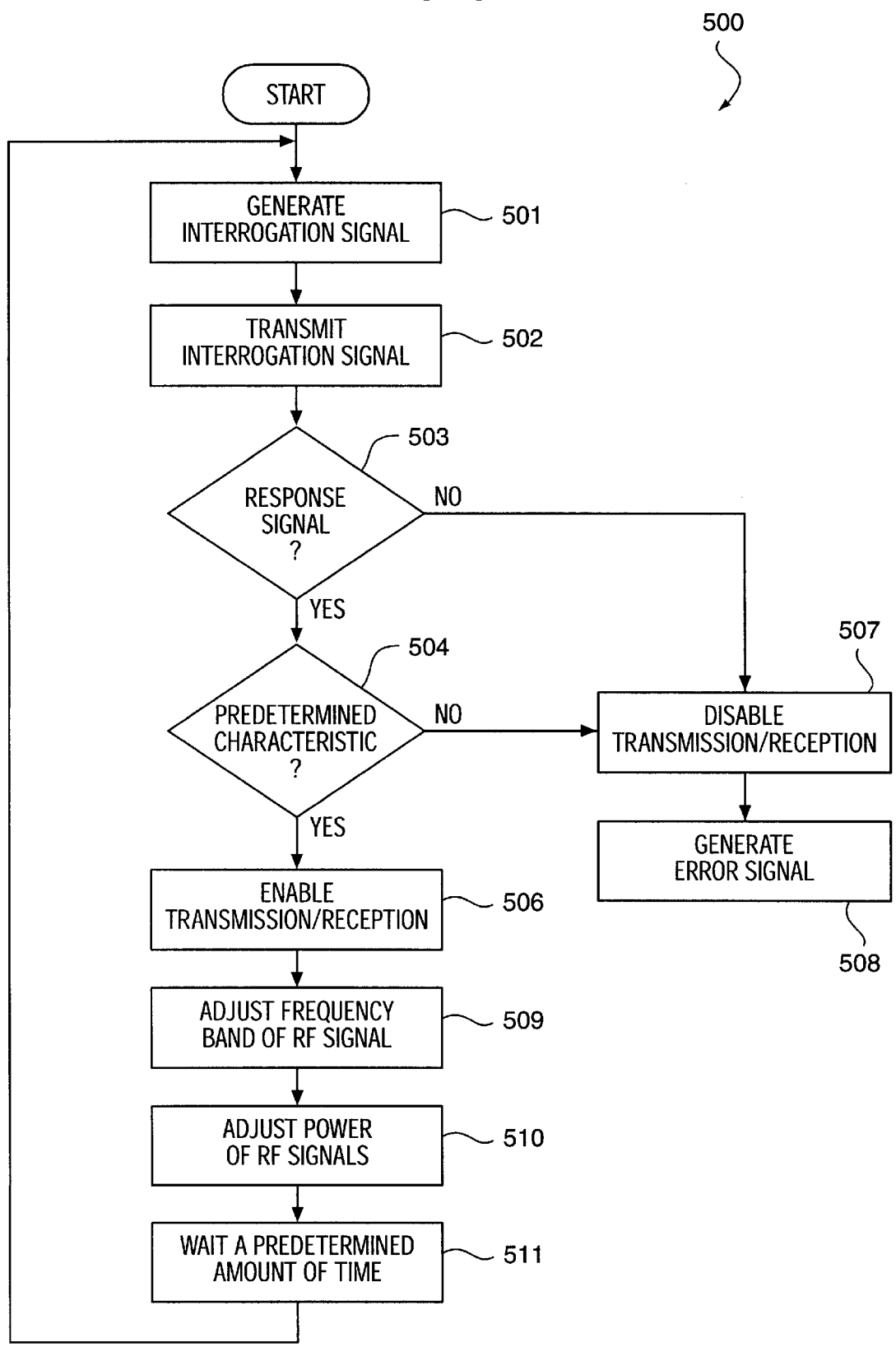
FIG. 5 illustrates an interrogation process for an interrogating device as provided by the present invention.

Interrogation Process—FIG. 5

FIG. 5 illustrates an interrogation process 500 that is executed by the controller of an interrogating device. Process 500 begins in step 501 with the controller of the interrogating device generating an interrogation signal. The interrogation signal can be a simple signal requesting a response or may have a predetermined code or characteristic embedded in the signal. In step 502, the interrogation signal is transmitted to the controller of a responding device. In step 503, the controller of the interrogating device determines if a response signal is received. If a response signal is not received, the controller of the interrogating device disables the transmission and/or reception of RF signals by system 100 in step 507. In one preferred exemplary embodiment, the controller of the interrogating device only waits a preprogrammed amount of time before determining a response signal has not been received and disabling system 100.

If a response signal is received, the controller of the interrogating device determines if the response signal has a predetermined characteristic in step 505. The predetermined characteristic can be something as simple as signal at a certain frequency band or something as elaborate as an encrypted code. In the preferred embodiment of the present invention, the predetermined characteristic is a response signal indicating that the responding device transmits or receives RF signals at the power or frequency band of the interrogating device. If the response signal does have the predetermined characteristic, the controller of the interrogating device enables the transmission and/or reception of RF signals in step 506 by permitting the interrogating device to receive and/or transmit RF signals to the responding device via feeder-line 102. If the response signal does not have the predetermined characteristic, the controller of the interrogating device disables the transmission or reception of RF signals in step 507 by preventing the interrogating device from transmitting or receiving RF signals via feeder-line 102.

The response signal can also indicate the frequency and the power that transceiver 101 transmits RF signals or the gain and the frequency of signals that antenna 103 transmits or receives. If the response signal does contain RF signal frequency band and power information, optional steps 509 and 510 are performed. In step 509, the controller of the interrogating device adjusts the power of the RF signals transmitted by system 100 to conform to the power of signals that is indicated in the response signal. In step 510, the controller of the interrogating device adjusts the frequency of the RF signals received and/or transmitted by system 100 to conform to the information in contained in the response signal. In another optional step, an error signal is generated in step 508 in response to system 100 being disabled from transmitting or receiving RF signals in step 507. The error signal can be used by the operator to detect possible failures in system 100.

A further security measure is provided by periodically executing process 500. This ensures that a proper antenna is not used to enable a transmission and is then replaced with an antenna having a higher gain. In order to periodically execute process 500, the controller of the interrogating device waits a predetermined amount of time in step 511 and then repeats process 500 starting from step 501.

Figure 6:
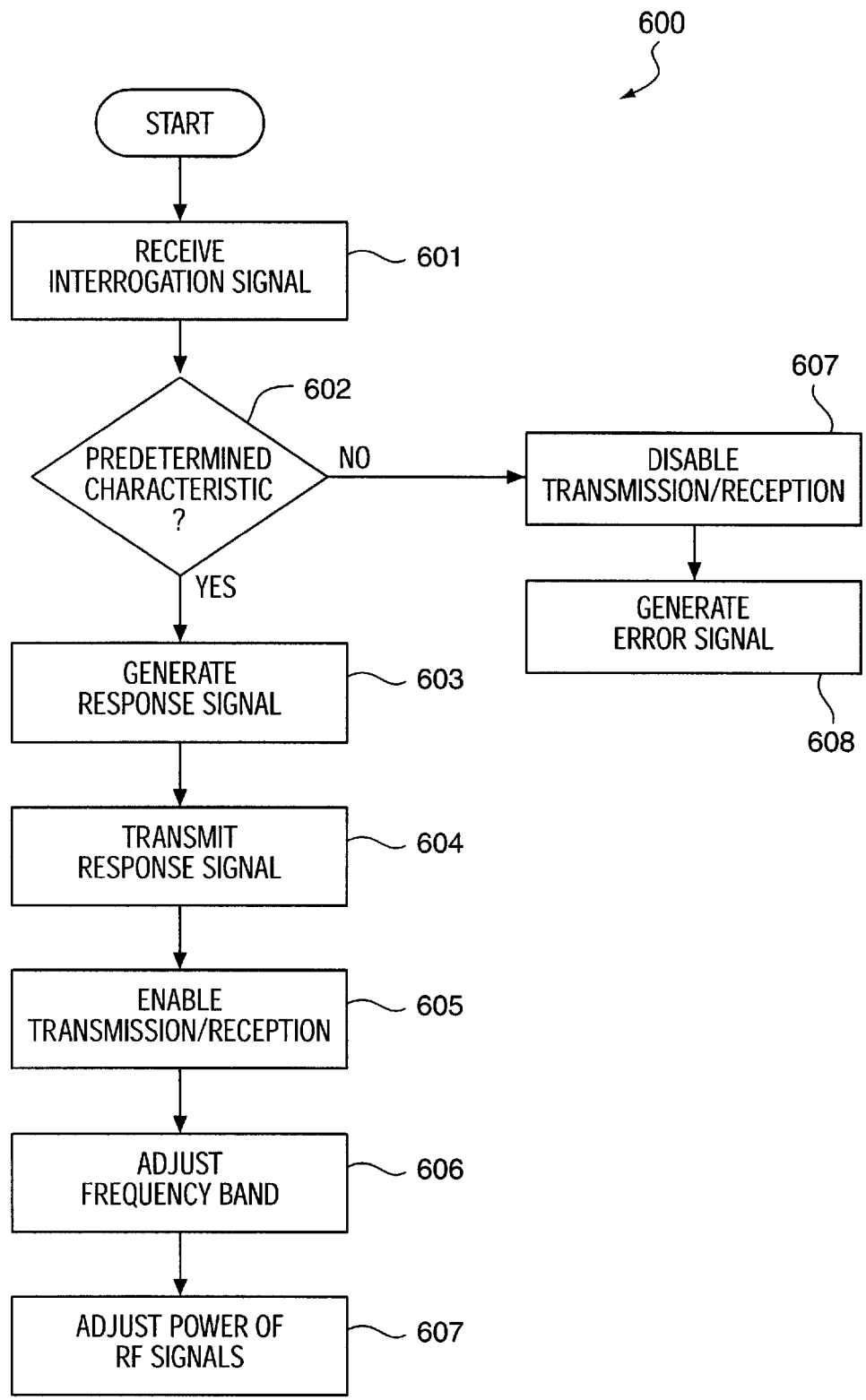
FIG. 6 illustrates a process for responding to an interrogation signal by a device being interrogated.

Process for Responding to an Interrogation Signal—FIG. 6

FIG. 6 illustrates a preferred exemplary embodiment of response process 600 executed by the controller of the responding device of system 100. Process 600 begins in step 601 with the controller of the responding device receiving an interrogation signal. In step 602, the controller of the responding device determines if the interrogation signal has a predetermined characteristic. One example of a predetermined characteristic is an identification code in the interrogation signal. A second example of a predetermined characteristic is a pseudo-random number generated by the interrogating device and included in the interrogation signal. If the interrogation signal does not have the predetermined characteristic, the controller of the responding device disables the transmission and/or reception of RF signals in step 607 by preventing the responding device transmitting or receiving RF signals via feeder-line 102. In an alternative exemplary embodiment, an error signal is generated in step 608 to indicate a possible malfunction of system 100.

If the response signal does have the predetermined characteristic, a response signal is generated in step 603. In one exemplary embodiment, the response signal is generated in the following manner. A pseudo-random number is received in the interrogation signal. A new pseudo-random number is generated for each interrogation signal. The controller of the responding device performs a mathematical calculation on the pseudo-random number. The result of the mathematical calculation on the pseudo-random number is then included in the response signal. In the controller of the interrogating device, the result in the response signal is compared to a result that the interrogating controller calculated using the pseudo random number. If the results are equal, the transmission or reception of RF signals are enabled. The use of pseudo-random numbers and mathematical equations makes it more difficult to duplicate the appropriate response signal.

In step 604, the response signal is transmitted over feeder-line 102 to the controller of the interrogating device. In step 605, the controller of the responding device enables the transmission and/or reception of RF signals by connecting the responding device to feeder-line 102. In alternative embodiments, it is possible for the interrogation signal to contain information about the interrogating device including the frequency and the power of the RF signals that the interrogating device is capable of transmitting and/or receiving. In step 606, the frequency band of the RF signals transmitted and/or received by the responding device is adjusted to conform to the frequency band of the RF signals required by the interrogating device as indicated in the interrogation signal. In step 607, the power of the RF signals received and/or transmitted by the responding device is adjusted in response to the RF signal power required by the interrogating device as indicated in the interrogation signal.

Figure 7:
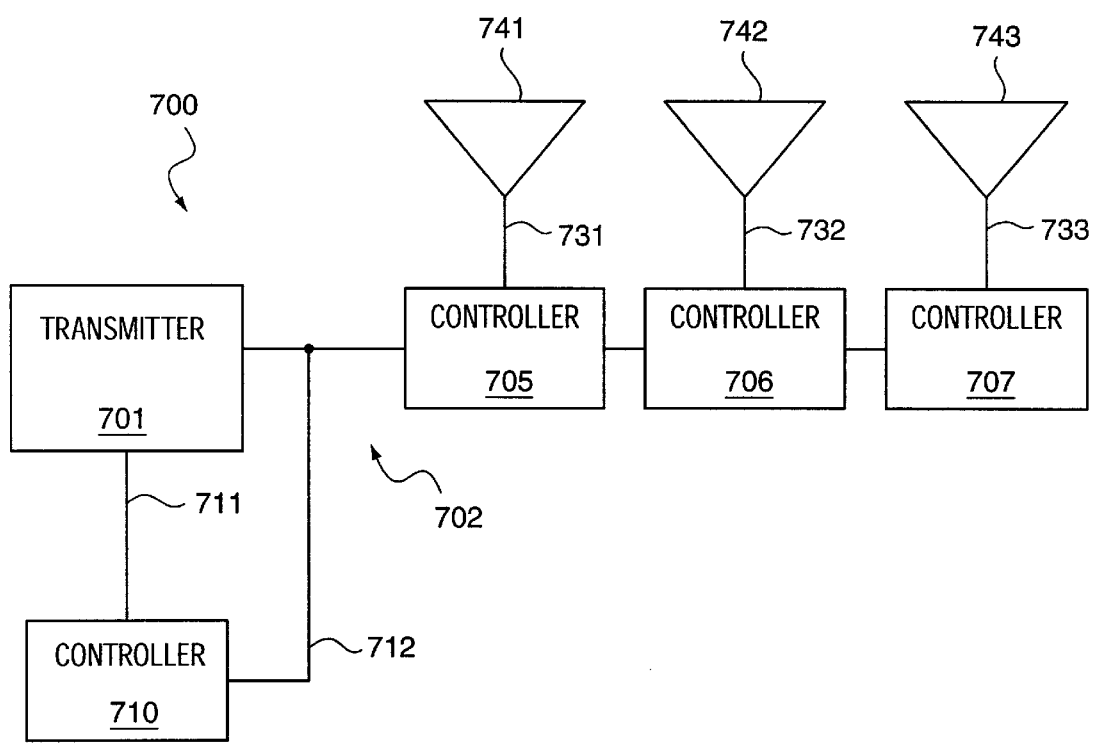
FIG. 7 illustrates a transceiver that is connected to a plurality of antennas.

Communications System Having Multiple Antennas Connected to a Transceiver—FIG.7

An alternate communications systems 700 is illustrated in FIG. 7. In communications system 700, the interrogation performed in accordance with the present invention is used to specify which antenna 741–743 is used to transmit or to receive RF signals by transceiver 701. Communications system 700 has a transceiver 701 which transmits and receives RF signals to and from antennas 741–743 via feeder-line 702. Transceiver controller 710 controls the operation of transceiver 701. Control signals are transmitted between transceiver controller 710 and transceiver 701 via path 711. Transceiver controller 710 is connected to feeder-line 702 via path 712 in order to transmit signals to and receive signals from antenna controllers 705–707. In the exemplary preferred embodiment, transceiver controller 710 is a processing unit as described above and illustrated in FIG.2.

Each antenna controller 705–707 is connected to feeder-line 102 in a daisy chain configuration. RF signals are received or transmitted by an antenna 741–743 to feeder-line 102 via a path 731–733. Antenna controllers 705–707 are identical to antenna controller 120 illustrated in FIG. 3 and can connect or disconnect paths 731–733 to feeder-line 102 by toggling switch 340 (See FIG. 3). An identity of each antenna 741–743 is stored in RAM 321 (shown in FIG. 3) of the corresponding antenna controller 705–707.

Figure 8:
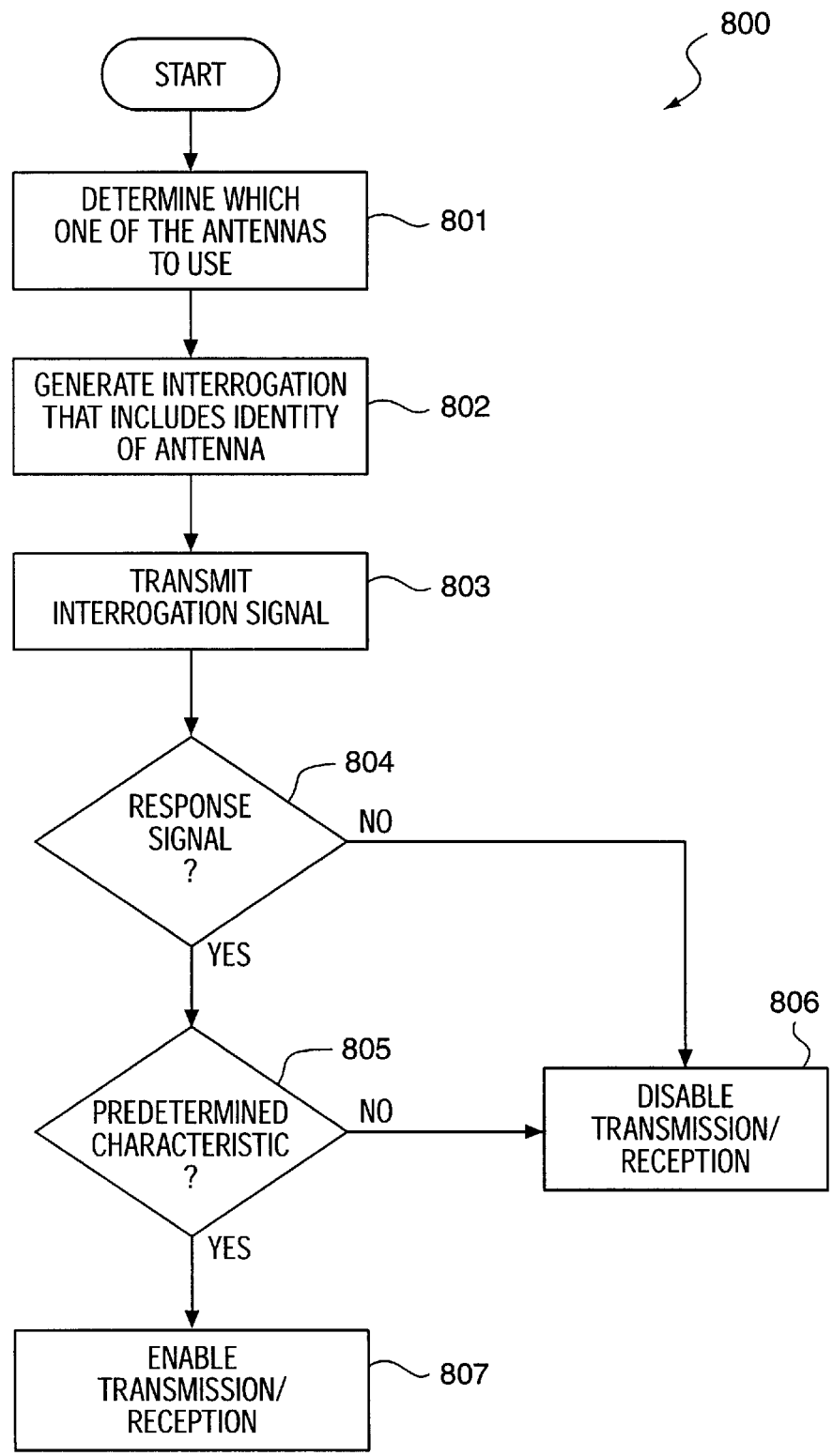
FIG. 8 illustrates a process for interrogating the plurality of antennas by the transceiver.

Process for Interrogating Antenna by Transceiver—FIG. 8

FIG. 8 illustrates an interrogation process 800 executed by transceiver controller 710 (shown in FIG. 7) for enabling communications system 700 to transmit or receive RF signals via one of the antennas 741–743 (shown in FIG. 7). Process 800 begins in step 801 by determining which antenna 741–743 to use for the transmission or reception of RF signals. One method for determining which antenna to use is to execute operational instructions specifying the antenna to be used. A second method for determining which antenna to use is to receive an input from an operator specifying which antenna to use.

In step 802, an interrogation signal that includes the identity of the antenna to be used to transmit or receive RF signals is generated. The interrogation signal is then transmitted to each of antenna controller 705–707 via feeder-line 702 and paths 721–723 in step 803. In step 804, transceiver controller 710 waits to detect a response signal. If no response signal is detected, transceiver controller 710 disables transmission or reception of RF signals by communications system 700 in step 806 by preventing transceiver 710 from receiving or transmitting RF signals via feeder-line 702.

If a response signal is received by transceiver controller 710, transceiver controller 710 determines if the response signal received has a predetermined characteristic in step 805. One example of a predetermined characteristic is an identity of the responding antenna in the response signal. If the response signal has the predetermined characteristic, transceiver controller enables communication system 700 to transmit or receive RF signals by allowing transceiver 701 to receive or transmit RF signals via feeder-line 702 in step 807. If the response signal does not have the predetermined characteristic, transceiver controller 710 disables transmission and/or reception of RF signals by preventing transceiver 701 to receive or transmit RF signals via feeder-line 702 in step 806.

Figure 9:
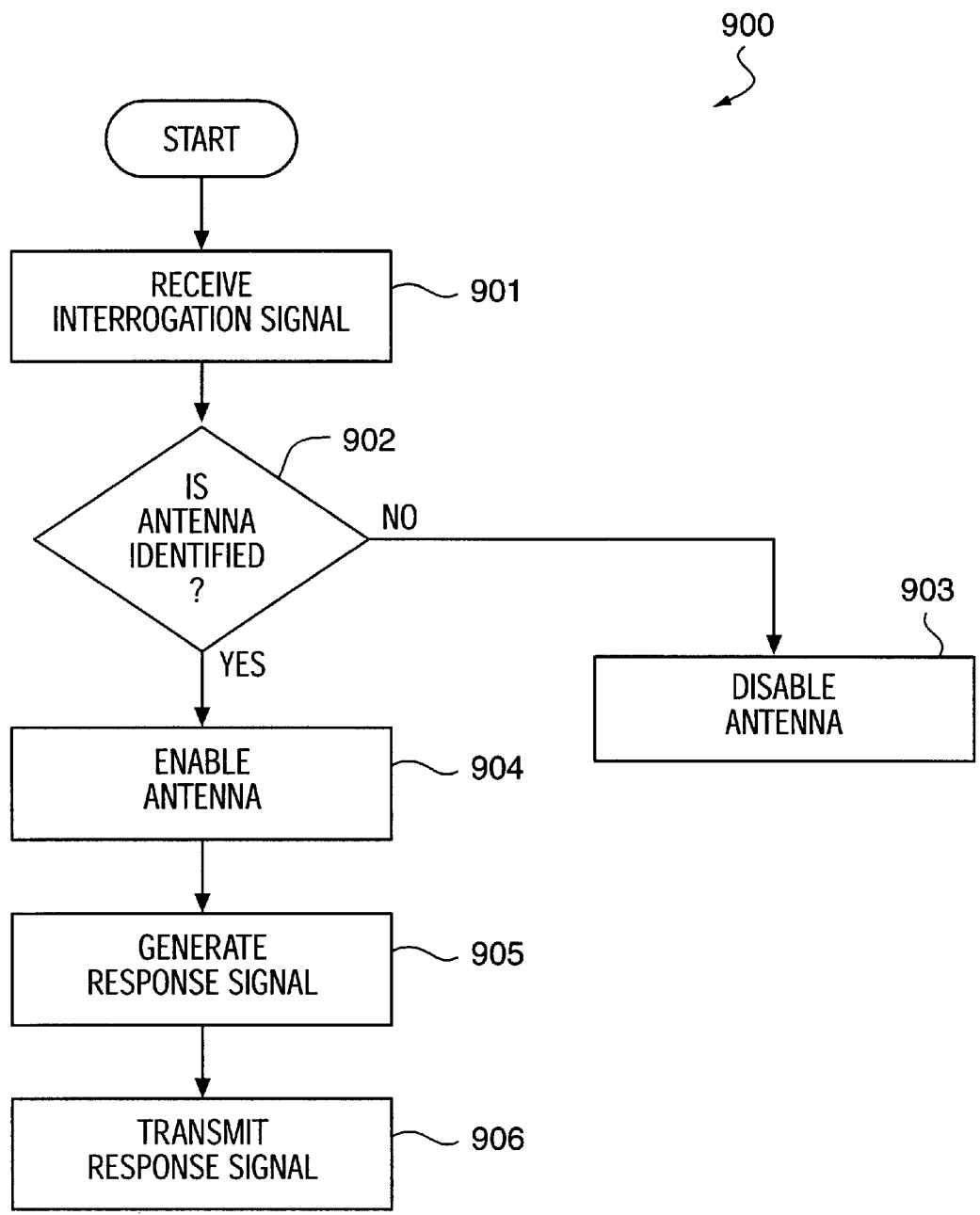
FIG. 9 illustrates a process for an antenna to respond to an interrogating transceiver.

Process for Responding to Interrogation Signal Performed by Each Antenna—FIG.9

FIG. 9 illustrates a process 900 executed by each of antenna controller 705–707 for responding to an interrogation signal from transceiver controller 710. Process 900 begins in step 901 with an antenna controller 705–707 receiving an interrogation signal. In step 902, the antenna controller determines if the identity of the antenna in the interrogation signal is the identity of the connected antenna stored in ROM 310. If the identity in the interrogation signal is not the identity of the connected antenna stored in ROM 310, the antenna controller disables the antenna from transmitting or receiving RF signals via feeder-line 702 in step 903.

If the identity in the interrogation signal is equal to the identity of the connected antenna stored in ROM 320 of the antenna controller, the antenna controller enables the antenna to transmit or receive RF signals via feeder-line 702 in step 904. In step 905, the antenna controller generates a response signal having the predetermined characteristic in response to the enabling of the antenna. As described above, the predetermined characteristic can be the identity of the antenna or some other code in the signal that can be used by transceiver controller 710 to determine that antenna selected in step 901 of process 900 is the antenna that is being used. In step 906, the generated response signal is then transmitted via feeder-line 702 and path 712 to transceiver controller 710.

Conclusion

The present invention relates to an interrogation between a transceiver and an antenna in a communications system prior to the transmission or reception of RF signals by the transceiver via the antenna. Although specific embodiments of the present invention are disclosed herein, it is expected that persons skilled in the art can and will design alternative communication systems that use interrogation between the transceiver and the antenna that are within the scope of the following claims either literally or through the Doctrine of Equivalents.

What is claimed is:

1. Apparatus for transmitting RF signals comprising:

a transceiver means at a first location;

an antenna means at a remote location;

a communications path between said transceiver means and said antenna means;

means for transmitting an interrogation signal over said communications path between said transceiver means and said antenna means;

means responsive to receiving said interrogation signal for generating a response signal having a predetermined characteristic from said interrogation signal;

means responsive to generating said response signal for transmitting a response signal having said predetermined characteristic over said communications path between said transceiver means and said antenna means;

means responsive to receiving said response signal for determining whether said response signal has said predetermined characteristic; and means responsive to a determination that said response signal has said predetermined characteristic for enabling a transmission of RF signals from said transceiver means via said antenna means.

2. The apparatus of claim 1 wherein said interrogation signal has a predetermined characteristic and said apparatus further comprises:

means responsive to receiving said interrogation signal for determining said interrogation signal includes specific information; and said means for generating said response signal being responsive to a determination that said interrogation signal has said predetermined characteristic.

3. The apparatus of claim 2 wherein said means for generating said response signal generates said response signal from said specific information in said interrogation signal.

4. The apparatus of claim 3 further comprising:

means for generating said interrogation signal to include said information needed to generate said response signal.

5. The apparatus of claim 4 wherein said information in said interrogation signal is a pseudo-random number and said predetermined characteristic in said response signal is a result of a predetermined operation performed on said pseudo-random number.

6. The apparatus of claim 2 further comprising:

means responsive to a determination that said interrogation signal has said predetermined characteristic for enabling said transmission of said RF signals from said transceiver means via said antenna means.

7. The apparatus of claim 2 further comprising:

means responsive to a determination that said interrogation signal does not have said predetermined characteristic for disabling said apparatus.

8. The apparatus of claim 2 further comprising:

means responsive to a determination that said interrogation signal does not have said predetermined characteristic for generating an error signal.

9. The apparatus of claim 1 wherein said interrogation signal is transmitted periodically.

10. The apparatus of claim 1 further comprising:

means for generating an interrogation signal prior to transmitting said interrogation signal.

11. The apparatus of claim 1 further comprising:

means responsive to a determination that said response signal does not have said predetermined characteristic for disabling said transmission of RF signals.

12. The apparatus of claim 1 further comprising:

means responsive to a determination that said response signal does not have said predetermined characteristic for generating an error signal.

13. The apparatus of claim 1 further comprising:

a plurality of antenna means at a plurality of remote sites connected to said communications path;

a specific identity for each of said plurality of antenna means;

means for determining a one of said plurality of antenna means to connect to said transceiver means;

means responsive to a determination of said one of said plurality of antenna means to connect to said transceiver means for generating an interrogation signal which includes said specific identity of said one of said plurality of antenna means;

said means for transmitting said interrogation signal being responsive to said generating of said interrogation signal and transmits said interrogation signal over said communication path from said transceiver means to each of said plurality of antenna means;

means responsive to receiving said interrogation signal for determining said specific identity of said one antenna means in said interrogation signal; and means responsive to a determination of said specific identity of said one of said plurality of antenna means for enabling said one antenna means;

said means for transmitting said response signal transmits a response signal including indicia said one antenna means is enabled;

means for determining said response signal has said predetermined characteristic determining whether said response signal includes said indicia that said one antenna is enabled; and said means for enabling said transmission of RF signals from said transceiver via said antenna means being responsive to a determination that said response signal includes said indicia.

14. The apparatus of claim 13 further comprising:

means responsive to determining said specific identity of said antenna means in said interrogation signal for disabling each of said plurality of antenna means not identified in said interrogation signal.

15. The apparatus of claim 13 further comprising:

means responsive to a determination said interrogation signal does not contain an identity of one of said plurality of antenna means for disabling said apparatus.

16. The apparatus of claim 13 further comprising:

means responsive to a determination said response signal does not have said indicia for disabling transmission of said RF signals from said transceiver means via said one of said plurality of antenna means.

17. The apparatus of claim 1 further comprising:

means responsive to receiving said response signal for adjusting the frequency band of said transmissions of said RF signals.

18. The apparatus of claim 1 further comprising:

means responsive to receiving said response signal for adjusting the power of said transmissions of said RF signals.

19. The apparatus of claim 1 further comprising:

means responsive to receiving said interrogation signal for adjusting the frequency band of said transmissions of said RF signals.

20. The apparatus of claim 1 further comprising:

means responsive to receiving said interrogation signal for adjusting the power of said transmissions of said RF signals.

21. The method of claim 1 wherein said transceiver means at a first location is connected to a plurality of antenna means each having a specific identity, said method further comprising the steps of:

determining a one of said plurality of antenna means to connect to said transceiver means;

generating an interrogation signal which includes said specific identity of said one of said plurality of antenna means responsive to a determination of said one of said plurality of antenna means to connect to said transceiver means;

said transmitting of said interrogation signal being responsive to said generating of said interrogation signal and transmits said interrogation signal over said communication path from said transceiver means to each of said plurality of antenna means;

determining said specific identity of said one antenna means in said interrogation signal responsive to receiving said interrogation signal;

enabling said one antenna means responsive to a determination of said identity of said one of said plurality of antenna means in said interrogation signal;

said transmitting of said response signal transmits a response signal including indicia that said one antenna means is enabled;

determining said response signal includes said indicia that said one antenna is enabled; and said enabling of said transmission of RF signals from said transceiver via said antenna means being responsive to a determination that said response signal includes said indicia.

22. The method of claim 21 further comprising the step of:

disabling each of said plurality of antenna means not identified in said interrogation signal responsive to determining said specific identity of said antenna means in said interrogation signal.

23. The method of claim 21 further comprising the step of:

disabling said apparatus responsive to a determination said interrogation signal does not contain an identity of one of said plurality of antenna means.

24. The method of claim 21 further comprising the step of:

disabling transmission of said RF signals from said transceiver means via said one of said plurality of antenna means responsive to a determination said response signal does not have said indicia.

25. A method for transmitting RF signals from a transceiver means at a first location via antenna means at a remote location that is connected to said transceiver means via a communications path comprising the steps of:

transmitting an interrogation signal over said communications path between said transceiver means and said antenna means;

generating a response signal having a predetermined characteristic from said interrogation signal;

transmitting said response signal over said communications path between said transceiver means and said antenna means responsive to receiving said interrogation signal;

determining whether said response signal has said predetermined characteristic responsive to receiving said response signal; and enabling a transmission of RF signals from said transceiver means via said antenna means responsive to a determination that said response signal has said predetermined characteristic.

26. The method of claim 25 wherein said interrogation signal has a predetermined characteristic and said method further comprises the steps of:

determining said interrogation signal includes specific information responsive to receiving said interrogation signal; and said generating of said response signal over said communications path being responsive to a determination that said interrogation signal has said predetermined characteristic.

27. The method of claim 26 said step of generating said response signal comprises the step of:

generating said response signal from information in said interrogation signal responsive to a determination that said interrogation signal has said predetermined characteristic.

28. The method of claim 26 further comprising the step of:

generating said interrogation signal to include said information needed to generate said response signal.

29. The method of claim 28 wherein said information in said interrogation signal is a pseudo-random number and said predetermined characteristic in said response signal is a result of a predetermined operation performed on said pseudo-random number.

30. The method of claim 26 further comprising the step of:

enabling said apparatus to transmit said RF signals from said transceiver means via said antenna means responsive to a determination that said interrogation signal has said predetermined characteristic.

31. The method of claim 26 further comprising the step of:

disabling said transmission of RF signals responsive to a determination that said interrogation signal does not have said predetermined characteristic.

32. The method of claim 26 further comprising the step of:

generating an error signal responsive to a determination that said interrogation signal does not have said predetermined characteristic.

33. The method of claim 25 wherein said interrogation signal is periodically transmitted.

34. The method of claim 25 further comprising the step of:

generating an interrogation signal prior to transmitting said interrogation signal.

35. The method of claim 25 further comprising the step of:

disabling said transmission of RF signals by said transceiver means via said antenna means responsive to a determination that said response signal does not have said predetermined characteristic.

36. The method of claim 25 further comprising the step of:

generating an error signal responsive to a determination that said response signal does not have said predetermined characteristic.

37. The method of claim 25 further comprising the step of:

adjusting the frequency band of said transmissions of said RF signals responsive to receiving said response signal.

38. The method of claim 25 further comprising the step of:

adjusting the power of said transmissions of said RF signals responsive to receiving said response signal.

39. The method of claim 25 further comprising the step of:

adjusting the frequency band of said transmissions of said RF signals responsive to receiving said interrogation signal.

40. The method of claim 25 further comprising the step of:

adjusting the power of said transmissions of said RF signals responsive to receiving said interrogation signal.

* * * * *